United States Patent [19]

Ramunas

[11] 4,298,141
[45] Nov. 3, 1981

[54] OBJECT SEPARATOR

[75] Inventor: Valdas S. Ramunas, Euclid, Ohio

[73] Assignee: Acme-Cleveland Corporation, Highland Heights, Ohio

[21] Appl. No.: 35,633

[22] Filed: May 3, 1979

[51] Int. Cl.³ ............................................. B65G 59/00
[52] U.S. Cl. .................................... 221/251; 221/255; 221/275; 414/748
[58] Field of Search ............... 221/178, 192, 207, 251, 221/275, 296, 298, 255; 414/745, 748

[56] References Cited

U.S. PATENT DOCUMENTS

| | | | |
|---|---|---|---|
| 297,496 | 4/1884 | Campbell | 221/174 |
| 1,243,723 | 10/1917 | Evans | 221/298 X |
| 1,604,220 | 10/1926 | Davis et al. | 227/113 |
| 1,888,520 | 11/1932 | Twomley | 221/12 |
| 2,785,400 | 3/1957 | McIlvin et al. | 221/251 |
| 2,937,788 | 5/1960 | Darsie | 221/298 |
| 2,991,892 | 7/1961 | DeHaas | 414/736 |

FOREIGN PATENT DOCUMENTS 260487  5/1913  Fed. Rep. of Germany ...... 221/298

Primary Examiner—F. J. Bartuska
Attorney, Agent, or Firm—Pearne, Gordon, Sessions, McCoy & Granger

[57] ABSTRACT

A separator or escapement mechanism is disclosed which separates or holds one of serially movable objects, such as the second or nth object from the exit end of a support structure. This support may be a sloping ramp so that the objects, if of circular cross section, may roll toward the exit end. The object at the exit end may be held by a stop and the second or nth object may be engaged by a bar holder along the upper surface thereof regardless of the dimension of such object within a given range of sizes. The bar holder moves along a first path at an acute angle to second and third paths, the second path being the path of movement of the upper surface of the maximum size objects and the third path being the path of movement of the upper surface of minimum size objects. The first path intersects the ramp surface at approximately the exit end and is disposed at an acute angle to such ramp surface. The foregoing abstract is merely a resume of one general application, is not a complete discussion of all principles of operation or applications, and is not to be construed as a limitation on the scope of the claimed subject matter.

16 Claims, 4 Drawing Figures

OBJECT SEPARATOR

BACKGROUND OF THE INVENTION

Separating devices have been used in a number of machine mechanisms. A button machine was disclosed in U.S. Pat. No. 297,496 wherein the blanks for the buttons were provided in a chute and to use the lowermost blank in the machine operation, a lever was depressed which moved the remaining button blanks in the chute upwardly away from the lowermost blank.

In U.S. Pat. No. 1,604,220 a nailing device was disclosed wherein a separator wedge is transversely driven between the lowermost nail and those above such nail.

U.S. Pat. No. 1,888,520 discloses a rocking nail gate which allows several nails through the gate at one time and primarily acts as a safety stop to prevent overloading of nails.

U.S. Pat. No. 2,991,892 discloses a device for feeding bars to a machine tool and discloses a structure which is somewhat more common in the industry. In this structure, two camactuated, pivoted arms act alternately to hold and release the lowermost one of serially loaded bars in a chute.

All of these mechanisms have a principal difficulty of being of use for objects all of one size and tolerate only very small part diameter variations. Whenever the machine is to be changed to operate on a different diameter part, then considerable time is required for various machine adjustments to accommodate this new diameter of parts. This increases the down-time of the machine in its set-up for operation on a new size of part, and therefore tends to make uneconomic the frequent changeover to a different part size.

When the object separator is used with bar loading devices for a machine tool, such bars are often heavy, e.g., as much as 500 pounds in weight and up to several inches in diameter. In order to change the size of bar used with the machine tool, several adjustments are required. Several sets of parts have to be stored, removed from storage, and used to replace existing parts on the machine tool and the removed parts then must be moved to storage. Thus, considerable time is used for accomplishing this change of parts to accommodate a new bar diameter and, in addition, the machine set-up time is all downtime, with no parts capable of being produced while these part replacements and necessary adjustments are being made.

The problem to be solved, therefore, is how to construct a mechanism which will automatically separate serially moving objects, regardless of the size of such objects, and which will accommodate a considerable range of object dimensions.

SUMMARY OF THE INVENTION

This problem is solved by a size-compensating escapement mechanism for plural objects within a first range of cross sectional dimensions, said escapement mechanism comprising, in combination, a support surface adapted to hold a plurality of objects all within a first range of cross sectional dimensions, means for urging any objects on said surface toward an exit end of said surface, a track adjacent said surface, an object holder connected to be movable along said track in a first path, said first path intersecting said surface substantially at said exit end and disposed generally at a first acute angle A relative to said surface, said object holder being movable along said track toward said exit end to a holding position along said first path engaging the upper surface of the object in the nth position relative to said exit end, where n is a plural number integer, and the movement of said object holder along said track away from said exit end releasing the object in the nth position to permit it to be urged in movement toward said exit end.

This problem is further solved by an escapement mechanism having a pallet insertable into and removable from the path of movement of serially disposed objects movable along a surface toward an exit end thereof, characterized in that said mechanism is automatic size compensating by means mounting said pallet for movement along a first path which intersects at an acute angle the path of movement of the objects, said path of movement being parallel to the object supporting surface and of variable distance therefrom depending on the size of the objects.

An object of the invention is to provide an object separator which automatically compensates for the size of the objects within a range of sizes.

Another object of the invention is to provide an object separator wherein a holder for the serially movable objects is movable in an acutely angled path intersecting the path of movement of the objects.

Another object of the invention is to provide an escapement mechanism with a pallet which may be movable between two objects so as to hold the nth object in a series of such objects.

Other objects and a fuller understanding of the invention may be had by referring to the following description and claims, taken in conjunction with the accompanying drawing.

DESCRIPTION OF THE PREFERRED EMBODIMENTS

Figure 1:
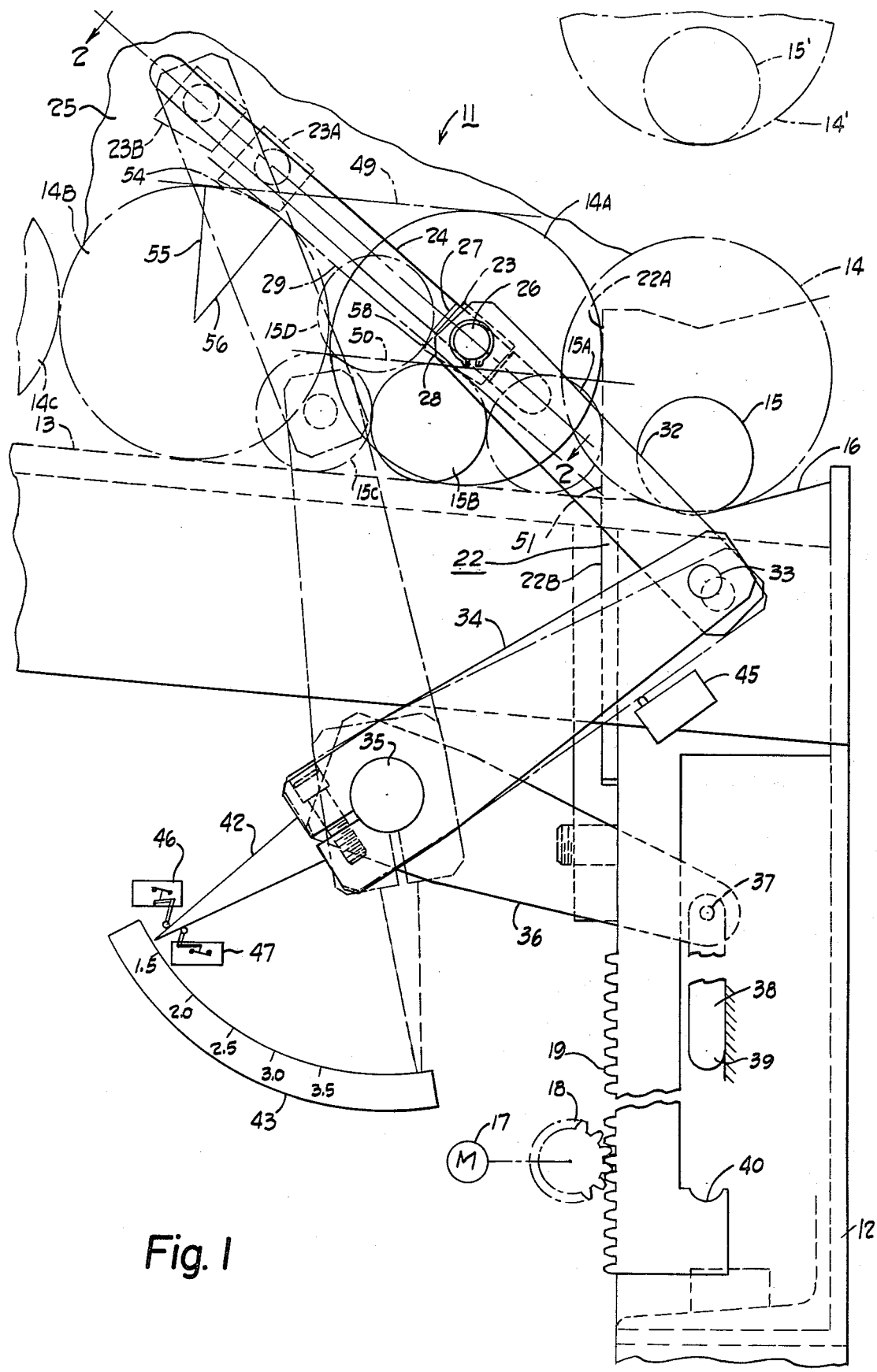
FIG. 1 is a side elevational view of an escapement mechanism according to the invention.
Figure 2:
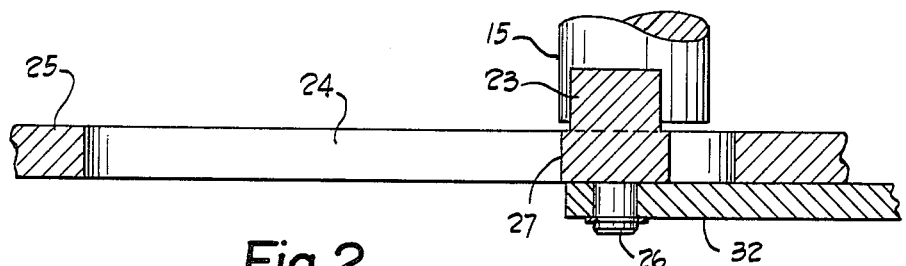
FIG. 2 is a sectional view on line 2—2 of FIG. 1.
Figure 3:
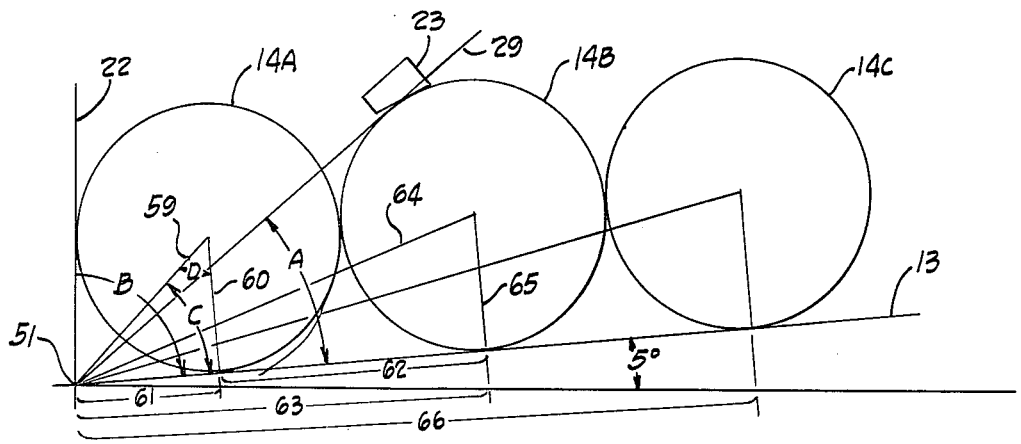
FIG. 3 is an enlarged, schematic view from the opposite direction of FIG. 1, illustrating the calculation of the path angle.

FIGS. 1, 2, and 3 illustrate an escapement mechanism 11 which has a frame 12. A support surface 13 is mounted on the frame 12 and adapted to support a plurality of serially disposed objects 14 or 15. These objects are movable on the support surface by some urging means, and in the preferred embodiment this urging means is established by mounting the support surface 13 at a small angle, e.g., 5 degrees, relative to the horizontal so that it acts as a ramp surface. A movable carriage 16 is movable on the frame 12, and this movable carriage may be a V-shaped roller or a V-block which is moved vertically by means of a motor 17 driving through a pinion 18 and a rack 19 connected to the carriage 16. In one embodiment of this escapement mechanism 11, the objects 14 or 15 are rollable and may be rollable metal bars for use in a machine tool. The carriage 16 may thus move an object, such as a bar 15, from a position resting on the carriage 16 upwardly to a utilization position 15' in the machine tool, the details of which are not shown.

The escapement mechanism 11 is automatically size compensating, as described below, so that not only large size objects 14 but also small size objects 15 may be controlled in escapement.

A stop means 22 is provided in the mechanism 11 to provide a stop for any of the objects 14 or 15 rolling down the ramp surface 13. This stop means has a stop position and a release position. The stop means 22 may move up to the stop position 22A and then cease movement while the carriage continues on upwardly, or the stop means 22 may be a continuous surface on the carriage 16 to continue to abut any of the objects 14 and 15 despite continued vertical movement of the carriage 16. As such, the stop means 22 will have a vertical movement and this stop surface is disposed at an angle B relative to the ramp surface 13. With this ramp at a 5-degree angle, as shown, the angle B is 85 degrees in this embodiment. The dotted-line position 22A in FIG. 1 shows the stop means in the stop position, and it will be lowered to a solid-line position 22B below the ramp 13 in order to establish the release position for the bars or objects 14, 15.

An object holder or pallet 23 is movable along a track 24. This track 24 is shown as a slot in a plate 25 fixed to the frame 12. The object holder 23 is fixed to a slide block 27, which slides in the slot track 24 to guide this object holder 23 so that a holding surface 28 thereof moves along a first path 29, which is parallel to the slot track 24.

The object holder 23 is moved along the track 24 by a suitable mechanism, shown in this embodiment as a link 32 pivoted on a pin 26 fixed to the slide block 27. The link 32 is pivoted at 33 to a lever 34. This lever is fixed to a shaft 35 pivoted in the frame 12 and rotated by a lever 36 which is pivoted at 37 to a link 38. The upper end of the link 38 is free to move in the arc of movement of the lever 36, but the lower end of this link 38 is guided for vertical movement and has a rounded, lower end 39 to be engaged by a socket 40, movable with the rack 19.

A pointer 42 is connected somewhere on the linkage to the object holder 23 and, as shown, this pointer 42 is secured to rotate with the shaft 35 and cooperates with a scale 43. Switches to indicate the position of the object holder 23 are provided, such as a switch 45 mounted to be actuated by the lever 34, or switches 46 and 47 mounted to be actuated by the pointer 42.

Operation

The escapement mechanism 11 is automatically size-compensating for different sizes of movable objects, with the size being within a given range of dimensions or diameters. The reason for the size range is the practical limit established by a given escapement mechanism 11, which in this embodiment is limited by the length of the track 24. The large size objects 14, which are the largest objects used with the machine tool, have an upper surface which is movable in a path 49. The upper surface of the small objects 15 moves in a path 50, with these two paths 49 and 50 being parallel to the ramp support surface 13. The track 24 is therefore made sufficiently long so that the holding surface 28 of the object holder 23 will move along the first path 29 a distance sufficient to intersect the second path 49 and third path 50. Also, it will be noted that this first path 29 substantially intersects at the junction of the stop means 22 and the ramp surface 13, which junction is termed the ramp exit end 51.

When the stop means 22 is in the stop position 22A, then it presents a surface, vertical in this embodiment, against which bars or objects of various sizes may abut. A large bar 14A abutting the stop means 22 may be considered in a first position and a bar 14B abutting the first bar 14A may be considered to be in the second position. Many additional bars may be supported on the ramp 13, such as bar 14C in the third position. Thus, these are serially movable objects movable toward the exit end 51. If the small bars are presented, then the bar 15A abutting the stop 22 will be that considered in a first position and a bar 15B abutting bar 15A will be considered a bar in a second position. The bar 15C may be in a third position, etc.

The action of the escapement mechanism 11 is repetitive in cycles of operation. Let it be assumed that small bars 15A and 15B are loaded on the rack support 13 and that the mechanism 11 is in the full line position of FIG. 1, with the object holder holding surface 28 in engagement with the bar 15B in the second position. This will hold such bar by a type of wedging action. As the bar 15B tries to roll toward the stop 22, the force on the object holder 23 will be approximately perpendicular to the track 24 so that it is capable of resisting a large force. The motor 7 would be driven to lower the rack 19 and carriage 16, as well as lower the bar stop means 22 to the release position 22B. At this position, this stop means will be low enough so that the bar 15A in the first position will roll onto the carriage 16. The object holder 23 will now become effective to hold the bar 15B in the second position and all other serially positioned bars uphill thereof on the rack support 13. The motor 17 may now be reversed to raise the rack 19 and carriage 16 so that the bar is moved upwardly to a position 15', for utilization in the machine tool, not shown. As the carriage 16 is raised, the rack 19 raises the socket 40 and, after elimination of the lost motion space, engages the lower rounded end 39 of the link 38. This then arcuately rotates the shaft 39 and the lever 34 to move the object holder 23 upwardly along the track 24. This releases the bar 15B in the second position, permitting it and all the remaining bars to roll down the ramp surface 13 to abut the now-raised stop 22.

After the bar 15' is utilized in the machine tool, the then empty carriage 16 may be lowered. As it is lowered, and before stop means 22 moves to the release position 22B, the holding surface 28 of the object holder will engage the bar which has rolled down to the second bar position 15B. The holding surface 28 will engage the surface of bar 14B, for example, in an upper arc 54, which lies between radii 55 and 56. The radius 55 is perpendicular to the second path 49 and the radius 56 is perpendicular to the track 24. This will give a satisfactory wedging action wherein the force on the object holder 23 and transmitted to the track 24 is substantially perpendicular to track 24.

In FIG. 1, the object holder 23 is illustrated as engaging one of the small bars 15B, and in a dotted line position 23A it is shown as capable of engaging one of the maximum sized bars 14B. The dotted-line position 23B shows this object holder in the maximum elevation position which is sufficiently elevated to permit the maximum size objects 14 to move beneath the object holder to abut the stop means 22. When the rack 19 and carriage 16 are lowered, the object holder 23 moves downwardly along the track 24 a distance sufficient to engage whatever size object is being separated by the escapement mechanism 11. The object holder 23 moves down farther for small size objects than for large size objects, but eventually the object holder 23 is in engagement with the upper surface of one of these objects and then the linkage, 32, 34, and 38 stops its movement. This will thus establish a lost motion space between the rounded end 39 of link 38 and the rack socket 40.

The pointer 42 and scale 43 may be used as a convenient means to indicate the size of the objects each time the object holder or pallet 23 comes down into engagement with an object.

The switch 46 may be used to provide an electrical signal if the bar is undersized for any reason and the switch 47 may be used to indicate if the bar is oversized. For example, if the objects are bars being fed to a machine tool and they are supposed to be 1½ inch diameter bars, by mistake a 1⅝ inch diameter bar might accidentally be mixed in with the 1½ inch bars. In such case, the switch 47 would be actuated and this could be used to shut down the machine tool until the mistake was corrected. Also, switch 45 may be used to give a bar depletion signal to shut down the machine tool, if all of the bars on the ramp 13 have been used and more bars are needed.

The object holder 23 serves a dual purpose of an object unscrambler. The objects 14 or 15 are normally fed to the escapement mechanism serially, in abutment with each other, and in only a single file. However, in many cases, for example in bars fed to a machine tool, a large group of bars may be placed on the ramp surface 13 so that some, such as bar 15D, are lying on top of other bars 15B and 15C. In such case, when the rack 19 moves upwardly, the object holder 23 moves upwardly and the abutment surface 58 thereof pushes the bar 15D upwardly and rearwardly to act as an automatic object unscrambler so that the bars are provided in only a single file to the escapement mechanism. Accordingly, no separate unscrambler mechanism is required.

FIG. 3 illustrates schematically the escapement mechanism 11 taken from the opposite end view. This FIG. 3 illustrates the calculation of the preferred angle of the first path 29 which is parallel to the track 24. In FIG. 3, the holder 23 as illustrated schematically as moving along the first path 29 which intersects the exit end 51 of the ramp support surface 13. Only one size of bar 14 is shown on this ramp to avoid confusion of lines, but it will be understood that no matter what size bar is placed on this ramp 13, the upper surface thereof will come tangent to this first path 29 when such bar is in the second position, namely, the second from the stop means 22.

The escapement mechanism 11 may be utilized to hold or permit escapement of any bar in the nth position wherein n is an integer. In the illustrated embodiment, n=2 because the object holder 23 will hold or alternatively release the bar 14B in the second position. To calculate the theoretically correct angle of the first path 29, a line 59 is drawn to the center of the circle 14A. Let it be assumed that the radius of the circles 14 is a value of one unit. This makes the side 60 of the right triangle equal to one unit, which right triangle has the sides 59, 60 and 61. The line segment 62 along the ramp surface 13 has, therefore, a length of two units, namely, two radii. To determine the length of the line segment 63, a line 64 is drawn to the center of the circle 14B. This makes another right triangle with side 63, hypotenuse 64, and side 65, which is the radius of the circle, namely, a length of one unit.

The angle B is that angle between the stop means 22 and the ramp surface 13. In this example, the angle B equals 85 degress. Angle C, by geometry, is one-half angle B, and angle D equals 90 degrees minus angle C. Therefore, by geometry, the length of the side 61 is the tangent of angle D or the tangent of $$\left(90° - \frac{B}{2}\right).$$

For the second bar 14B, the length of the line segment 63 is two units more than the line segment 61 for the first bar and for the third bar 14C, the line segment 66 will be four units more than the line segment 61. Accordingly, it will be seen that the formula for the angle A of the first path 29 to the nth bar is:

$$A = 2 \operatorname{arcCot}\left[\tan\left(90° - \frac{B}{2}\right) + 2(n-1)\right] \quad (1)$$

Where n equals 1, the angle A calculates to 85°, which agrees with the fact that the stop 22 is at an 85° angle relative to the ramp support surface 13. Where n equals 2, the angle A equals 35.83°. Where n equals 3, angle A equals 22.15°, and so on. Where n is a plural number, the angle A is less than 45°. In practice, it has been found that the angle of the track 24, which establishes the angle of the path 29, is not at all critical. It might vary as much as 5 or 10 degrees from the theoretically correct angle, primarily because the holding surface 28 will still engage the upper arc 54 in a form of wedging action resisted by the track 24.

Figure 4:
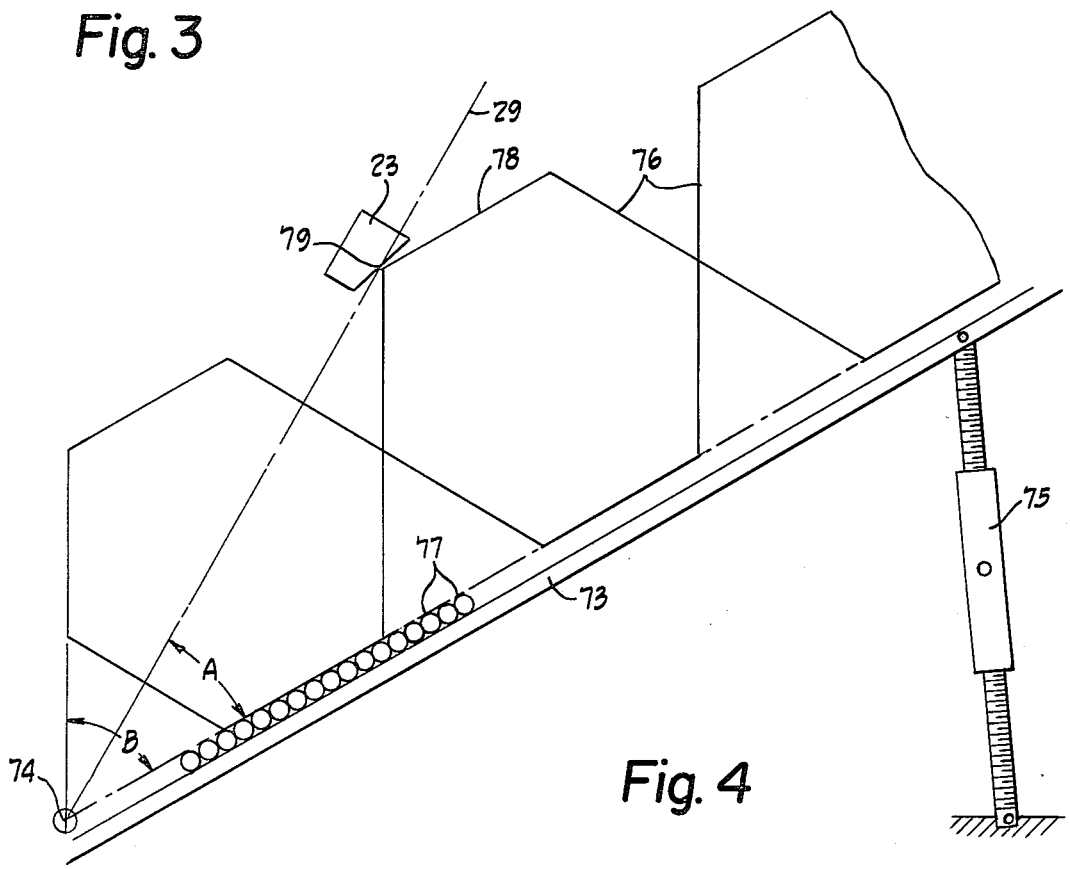
FIG. 4 is a schematic diagram similar to FIG. 3, but of a modification.

FIG. 4 illustrates a modification of the invention wherein a ramp support surface 73 is pivoted at 74 by means of a screw jack 75 so that the angle of this ramp 73 relative to the horizontal may be varied. This may be useful where other than rollable objects 76 are being controlled by the escapement mechanism. These objects 76 are illustrated as being hexagonal in cross section, such as hexagonal bars being fed to the machine tool, not shown. An alternative is to increase the urging force urging the object 76 toward the exit end at pivot 74 and this may be by a spring, pneumatic cylinder or weight on a cable, for example. Still another method may be to utilize rollers 77 as the ramp support surface so that the serially disposed objects 76 may easily move toward the exit end pivot 74. The object holder 23 moving along the path 29 again may intersect and hold an upper surface of each object 76. It may engage the flat upper surface 78, or, as shown, may engage a corner 79.

It will be noted that the object holder 23 is a form of pallet of an escapement mechanism which alternately acts with the stop means 22 to feed one or more objects to the exit end of the support surface 13. If such object holder 23 were to engage the third bar 14C, then a pair of objects would be fed at a time to the utilization mechanism.

This object holder 23 or pallet is insertable into and removable from the path of movement, such as path 49, of the serially disposed objects 14. The object holder or pallet is movable along a path directed toward the exit end 51 and disposed at an acute angle relative to the support surface 13.

It will be noted that the first path 29 is a straight line, which is tangent to any size bar in the nth position, n being 2 in this preferred embodiment.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A size-compensating escapement mechanism for plural objects within a first range of cross sectional dimensions, said escapement mechanism comprising, in combination,
   a support surface adapted to hold a plurality of objects of a size between small and large within a first range of cross sectional dimensions,
   means for urging any objects on said surface toward an exit end of said surface,
   a track adjacent said surface,
   an object holder connected to be movable along said track in a first path,
   said first path intersecting said surface substantially at said exit end and disposed generally at a first acute angle A relative to said surface,
   said object holder being movable along said track toward said exit end to a holding position along said first path engaging the upper surface of the object in the nth position relative to said exit end, where n is a plural number integer,
   said movement of said object holder along said track toward said exit end causing said object holder to engage the upper surface of a small object in a holding position closer to said exit end than the holding position of engagement of the upper surface of a large object to automatically compensate for different sizes of objects,
   the movement of said object holder along said track away from said exit end releasing the object in the nth position to permit it to be urged in movement toward said exit end, and whereby when round objects are being released, said first path is substantially parallel to a line tangent to an nth large size round object and an nth small size round object.

2. An escapement mechanism as set forth in claim 1, wherein said first path is a straight line.

3. An escapement mechanism as set forth in claim 1, wherein the objects are all of substantially the same size within said first range of dimensions.

4. An escapement mechanism as set forth in claim 1, wherein said angle A is less than 45°.

5. An escapement mechanism as set forth in claim 1, including stop means adjacent said exit end of said surface having stop and release positions and in said stop position adapted to be abutted by an object in a first position adjacent said exit end of said surface,
   and said stop means in said release position releasing from said support surface any said object closer to said exit end than said object holder.

6. An escapement mechanism as set forth in claim 1, wherein n is 2.

7. An escapement mechanism as set forth in claim 6, wherein said surface is a flat surface.

8. An escapement mechanism as set forth in claim 7, wherein said urging means includes means establishing said flat surface at a small acute angle relative to the horizontal.

9. An escapement mechanism as set forth in claim 8, including stop means adjacent said exit end of said surface adapted to be abutted by an object in a first position adjacent said exit end.

10. An escapement mechanism as set forth in claim 9, wherein said stop means is at an acute angle of about 85° relative to said surface.

11. An escapement mechanism having a pallet insertable along a first path into and removable from a second path of movement of serially disposed objects movable along a surface toward an exit end thereof,
    characterized in that said mechanism is automatic size compensating by means mounting said pallet for movement toward the objects along the first path which intersects and crosses the second path of movement of the objects, said second path of movement of the object being parallel to the object supporting surface and of variable distance therefrom depending on the size of the objects,
    stop means adjacent said exit end adapted to be abutted by objects,
    said first path being disposed at an angle A relative to said surface,
    said stop means being disposed at an angle B relative to said surface, and
    said first path angle A equals substantially:

$$A = 2 \operatorname{arcCot}\left[\tan\left(90° - \frac{B}{2}\right) + 2(n-1)\right]$$

where n is a plural number integer and is the position from said stop means of the object acted on by the pallet.

12. An escapement mechanism as set forth in claim 11, wherein the objects are variable in size between a maximum and a minimum cross sectional dimension,
    said path of movement of the objects being variable from said second path when the objects are a maximum dimension to a third path when the objects are a minimum dimension, and
    said mounting means establishing movement of said pallet in said first path to cross said second and third paths.

13. An escapement mechanism as set forth in claim 11, wherein said first path intersects said surface substantially at said exit end.

14. A size-compensating escapement mechanism for plural objects within a first range of cross sectional dimensions, said escapement mechanism comprising, in combination,
    a support surface adapted to hold a plurality of objects of a size between small and large within a first range of cross sectional dimensions,
    means for urging any objects on said surface toward an exit end of said surface,
    a track adjacent said surface,
    an object holder connected to be movable along said track in a first path,
    said first path intersecting said surface substantially at said exit end and disposed generally at a first acute angle A relative to said surface, said object holder being movable along said track toward said exit end to a holding position along said first path engaging the upper surface of the object in the nth position relative to said exit end, where n is a plural number integer, said movement of said object holder along said track toward said exit end causing said object holder to engage the upper surface of a small object in a holding position closer to said exit end than the holding position of engagement of the upper surface of a large object to automatically compensate for different sizes of objects, the movement of said object holder along said track away from said exit end releasing the object in the nth position to permit it to be urged in movement toward said exit end, stop means adjacent said exit end of said surface adapted to be abutted by an object in a first position adjacent said exit end, said stop means being disposed substantially at an angle B relative to said exit end of said surface, and said first acute angle A equals substantially $$A = 2 \operatorname{arcCot}\left[\tan\left(90° - \frac{B}{2}\right) + 2(n-1)\right].$$

15. A size-compensating escapement mechanism for plural objects within a first range of cross sectional dimensions, said escapement mechanism comprising, in combination:

a flat support surface adapted to hold a plurality of objects of a size between small and large within a first range of cross sectional dimensions, means including establishing said flat surface at a small acute angle to the horizontal for urging any objects on said surface toward an exit end of said surface, a track adjacent said surface, an object holder connected to be movable along said track in a first path, said first path being a substantially straight line intersecting said surface substantially at said exit end and disposed at an angle of about 35° relative to said surface, said object holder being movable along said track toward said exit end to a holding position along said first path engaging the upper surface of the object in the second position relative to said exit end, said movement of said object holder along said track toward said exit end causing said object holder to engage the upper surface of a small object in a holding position closer to said exit end than the holding position of engagement of the upper surface of a large object to automatically compensate for different sizes of objects, the movement of said object holder along said track away from said exit end releasing the object in the second position to permit it to be urged in movement toward said exit end, stop means adjacent said exit end of said surface adapted to be abutted by an object in a first position adjacent said exit end, and said stop means being disposed at an acute angle of about 85° relative to said surface.

16. An escapement mechanism having a pallet insertable along a first path into and removable from a second path of movement of serially disposed objects movable along a surface toward an exit end thereof, characterized in that said mechanism is automatic size compensating by means mounting said pallet for movement toward the objects along the first path which intersects and crosses at an acute angle of less than 45° the second path of movement of the objects, said second path of movement of the object being parallel to the object supporting surface and of variable distance therefrom depending on the size of the objects, and an abuttable surface on the upper part of said pallet adapted to abut and move upwardly and away from said exit end any said objects lying on serially disposed objects which lie on said surface.

* * * * *